United States Patent [19]

Hughes et al.

[11] 4,399,428
[45] * Aug. 16, 1983

[54] THERMOSTAT

[75] Inventors: Paul R. Hughes, Sudbury; John E. Campbell, Brookline, both of Mass.

[73] Assignee: United Brands Company, New York, N.Y.

[*] Notice: The portion of the term of this patent subsequent to Dec. 16, 1997, has been disclaimed.

[21] Appl. No.: 115,413

[22] Filed: Jan. 25, 1980

Related U.S. Application Data

[62] Division of Ser. No. 882,885, Mar. 2, 1978, Pat. No. 4,240,077.

[51] Int. Cl.$^3$ .................. G08B 23/00; G08B 21/00; F25B 49/00; G05D 23/24
[52] U.S. Cl. .................. 340/500; 340/501; 340/584; 340/588; 340/589; 340/599; 340/636; 340/661; 236/78 B; 236/94; 62/126; 165/26
[58] Field of Search ............... 340/500, 501, 584, 588, 340/586, 589, 599, 595, 593, 661, 639; 165/11, 26; 236/78 B, 94; 62/126; 323/75 B; 364/550, 557

[56] References Cited

U.S. PATENT DOCUMENTS

| | | | |
|---|---|---|---|
| 3,616,846 | 11/1971 | Wills | 165/26 |
| 3,636,540 | 1/1972 | Harris | 340/599 |
| 3,815,815 | 6/1974 | Sapir | 165/26 |
| 3,918,636 | 11/1975 | Dawson | 165/26 |
| 3,940,686 | 2/1976 | Tanaka et al. | 323/75 B |
| 3,942,718 | 3/1976 | Palmieri | 165/26 |
| 4,240,097 | 12/1980 | Hughes et al. | 340/500 |

Primary Examiner—Donnie L. Crosland

[57] ABSTRACT

A thermostat monitoring and controlling the temperature of produce ripening within an enclosure and featuring a bridge circuit sensing errors between the actual and desired temperatures in which the desired temperature is selected directly in units of degrees. A bridge amplifier having feedback maintains the bridge in electrical balance to avoid errors due to changes in bridge component self heating. An error detection circuit having a single control simultaneously selects upper and lower error limits centered on the desired temperature, in units of degrees. The circuit indicates whenever the actual temperature goes outside these limits. An alarm circuit indicates a temperature error or a power failure in the thermostat at the thermostat and at a remote location. This circuit utilizes an alternating current source which activates current direction-dependent indicators operating on alternate half cycles. Electrical isolation of the temperature monitoring circuitry from the circuitry controlling heating, cooling and fan equipments is provided by coupling a signal indicating a temperature error through a single electrically isolating interface to equipment selection and control circuitry at line potential.

8 Claims, 9 Drawing Figures

THERMOSTAT

This is a division of application Ser. No. 882,885 filed Mar. 2, 1978, now U.S. Pat. No. 4,240,077.

BACKGROUND OF THE INVENTION

The marketing of certain types of produce, for example bananas, required that the produce be acquired in an unripe state and brought to a desired state of ripeness in varying but accurately predictable periods of time chosen in anticipation of market requirements.

The ripening rate of produce is predominately a function of the temperature of the produce and the ripening process is carried out by placing the produce in enclosures in which the temperature is controlled to give the desired rate. The ripening rate of produce such as bananas changes greatly for a temperature change as little as one degree and, if the produce temperature goes outside rather narrow limits, the produce may be ruined. Inaccurate temperature control, or a failure of the temperature control means, can thereby lead to substantial economic loss.

Previous temperature control devices have had the drawback of insufficient accuracy of temperature control and of insufficient accuracy in selection of the temperature, requiring a trial and error process dependent upon the skill of the operator.

The temperature control device must also provide a warning when the actual temperature of the produce goes outside of allowable limits. It is necessary for the warning to operate when there is a failure of power to the device.

As there are usually a minimum of personnel to monitor the ripening processes, it is necessary to give effective warning of a temperature error or power failure. It is also necessary to be able to add or disconnect enclosures from the warning without major modifications.

It is necessary to place the temperature control device in contact with the produce to accurately monitor the produce temperature. This requires that personnel handling the produce be protected from dangerous voltages existing in the heating, cooling and fan equipments connected to the temperature control device.

INTRODUCTION

This invention provides a thermostat for monitoring and controlling the temperature of produce ripening within an enclosure. It features simple and accurate temperature selection, accurate temperature error detection, and control of the allowable limits on temperature error. It also features an improved alarm system and protection of personnel from dangerous voltages.

SUMMARY OF THE INVENTION

For sensing an error between the actual and desired temperatures of the produce, the thermostat features a novel conductance bridge arrangement. One leg of the bridge is a temperature dependent conductance, placed in a temperature sensing relationship with the produce, while a second leg provides for selecting the desired temperature. This leg comprises a plurality of conductance in parallel, with each conductance having a switch element in series with it. These switch elements are mechanically coupled to a selector to open and close in predetermined patterns as the selector is progressively moved through its possible positions. The patterns are chosen to increase the aggregate conductance of the leg in regular increments so that it will equal that of the first leg at corresponding desired temperature intervals, preferably in decimal units of degrees.

The temperature error is detected by a bridge amplifier which compares the conductances of the first and second legs and generates an output which is proportionate to any difference in these conductances and thereby proportionate to the error. This amplifier features a feedback connection between its output and its comparison input which maintains the bridge in electrical balance despite differences between the conductances of the first and second legs. This feature allows the temperature error to be detected while avoiding errors arising from changes in the self heating of the bridge components due to electrical imbalance of the bridge.

The predetermined allowable limits on temperature error are controlled by a novel error detection circuit. This circuit selects the limits and indicates when the actual temperature of the produce goes outside of the limits. This circuit features an error amplifier having selectable gain and the error signal from the bridge amplifier as its input. The error signal is at the midpoint of its range when there is no error and deviates from this midpoint by an amount proportionate to the error. The error amplifier output is also at the midpoint of its range when there is no error and deviates from this midpoint by an amount proportionate to the error signal deviation. A selectable gain network controls the amount by which the output deviates for a given temperature error. Upper and lower limit detectors indicate when this output goes above or below upper and lower limits which are fixed at equal amounts above and below the midpoint of the amplifier output. The output can be selected to equal the upper and lower limits for any given temperature error and, when the error goes beyond these limits, an indication will be produced. The error limits are thereby established by the single gain control, are centered on the desired temperature, and are independent of the direction of temperature error. In a preferred embodiment, the gain selection network is comprised of a plurality of conductances in parallel with each conductance having a switch element in series with it. These switch elements are mechanically coupled to a selector to open and close in a predetermined pattern as the selector is moved through its possible positions. The patterns are chosen to determine the amplifier gain in regular increments of error limits selected in decimal units of degrees.

The alarm circuit is another feature of the thermostat and indicates when a temperature error has exceeded the selected limits or there is a failure of power to the thermostat. This circuit has a pair of wires extending from a remote location to the thermostat. A current source and an alarm indicator are connected in parallel between the wires at the remote location and another indicator and a switch are each connected in series with the wires at the thermostat. The error detection circuit allows the switch to open when there is a temperature error or power failure, so that the current flow in the alarm circuit is interrupted and the indicators are activated. A feature of this circuit is that a number of thermostats may be connected in series with the wires so that there will be a general alarm at the remote location and an individual alarm at each thermostat. In a preferred embodiment, the current source generates a slowly alternating output and the indicators, which are activated only for one direction of current flow, are arranged so that they are activated only during one half of the current cycle.

For protecting personnel from dangerous voltages existing in the heating, cooling and fan equipments, the thermostat features a novel circuit for controlling these equipments. This circuit contains a single electrically isolating interface, interposed between the temperature monitoring circuitry and the equipment control circuitry, through which control is accomplished. The error signal output from the bridge amplifier is quantized into a single signal indicating the direction of an error and coupled through the interface to a switch in the control circuitry. This switch selects which of the equipments will be energized by the quantized error signal and the selection is made in anticipation of temperature control requirements. In an embodiment, the isolation interface is comprised of a light emitting diode activated by the quantized signal and a photo-sensitive transistor detecting the emission and generating an output to the switch.

DESCRIPTION OF THE PREFERRED EMBODIMENT

We turn now to drawings and a description of a preferred embodiment of the invention.

DRAWINGS

DESCRIPTION

Figure 1:
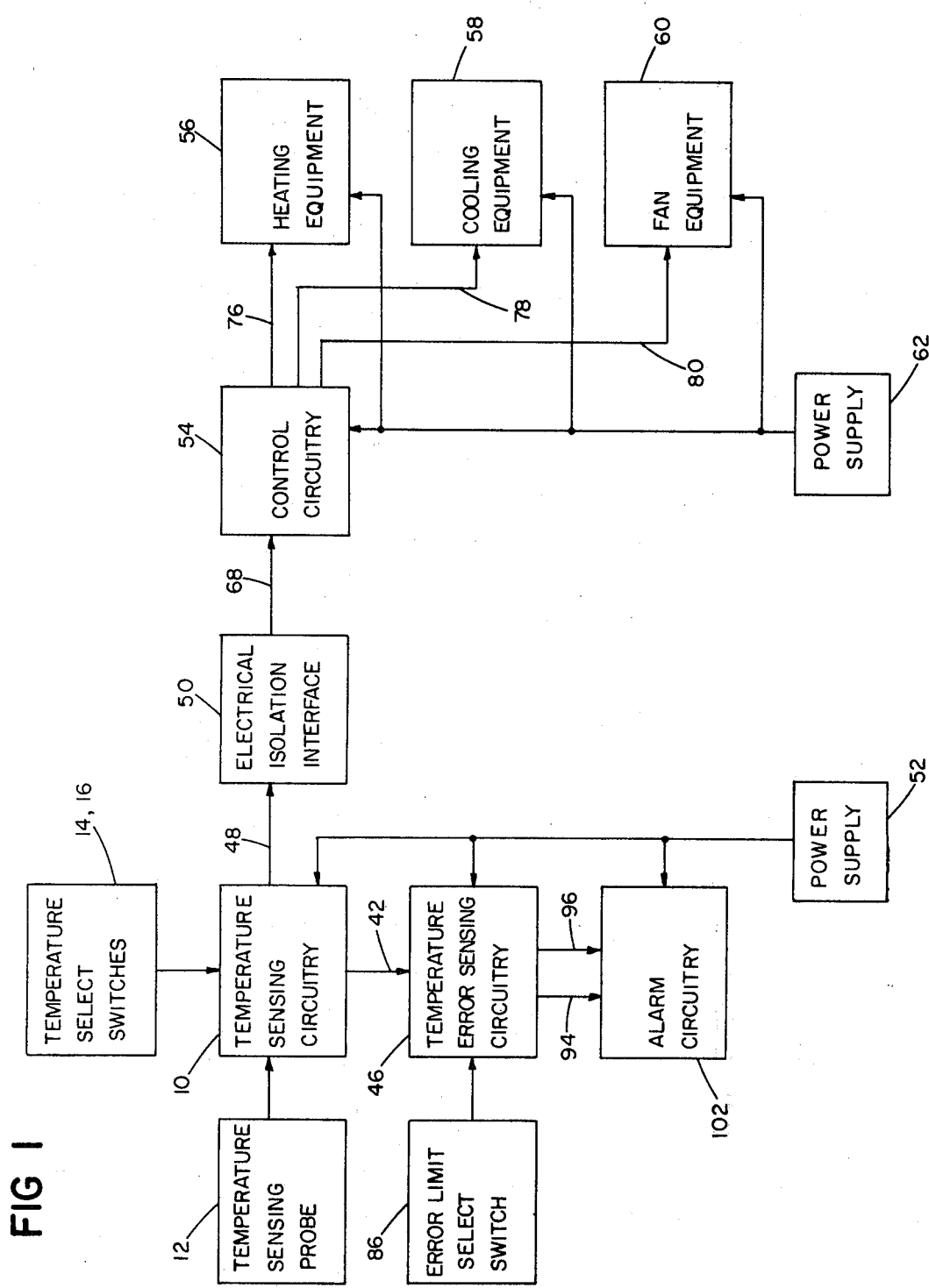
FIG. 1 is a block diagram of the preferred embodiment.

Referring to FIG. 1, temperature sensing circuitry 10 cooperates with temperature sensing probe 12 and temperature selection switches 14 and 16 to detect the temperature of the produce, compare this temperature to the selected temperature, and generate signals used to control the temperature of the produce.

Figure 2:
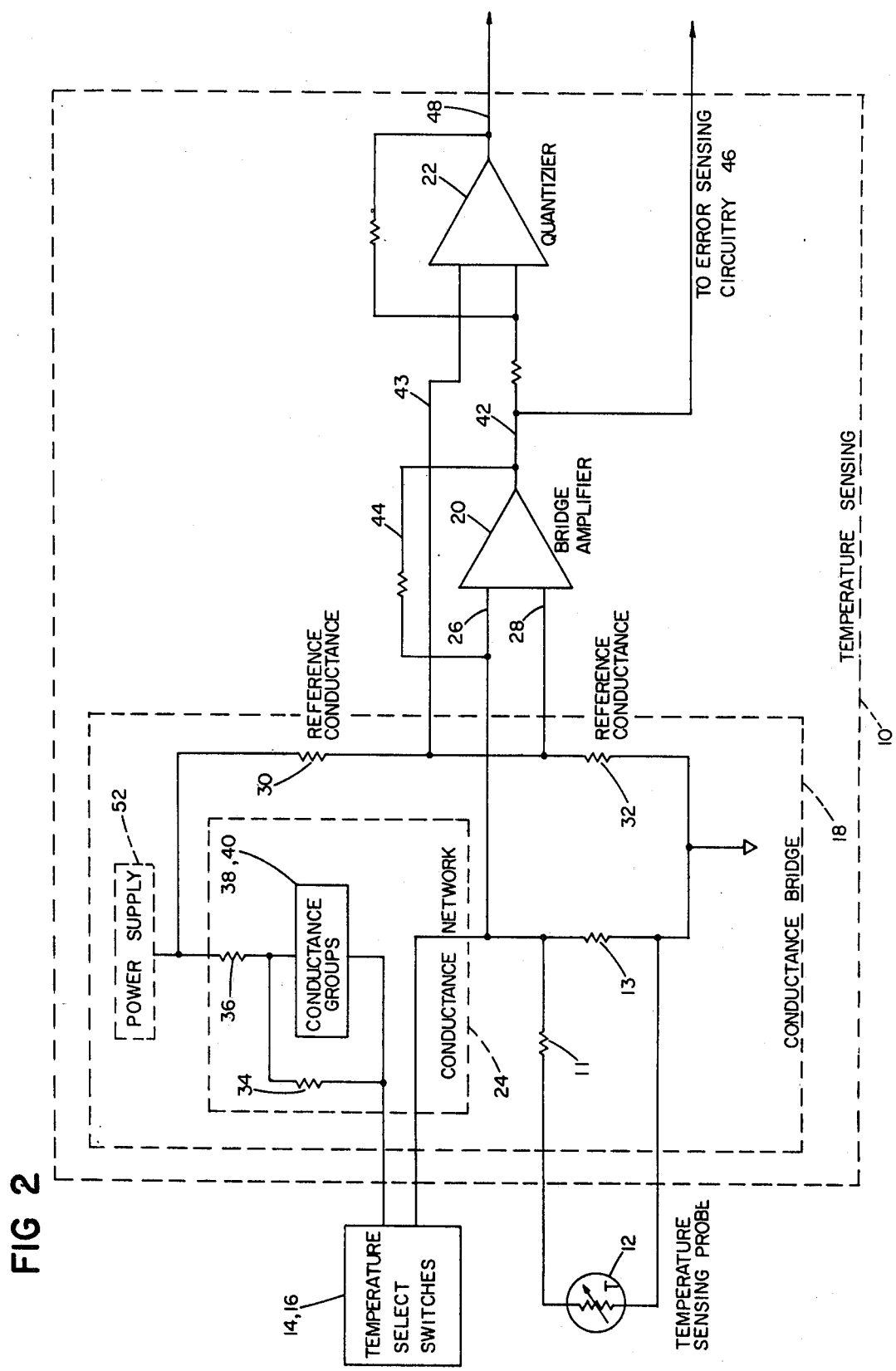
FIG. 2 shows the operation of the temperature sensing circuitry.

Referring to FIG. 2, temperature sensing circuitry 10 is comprised of conductance bridge 18, bridge amplifier 20, and quantizer 22. Temperature sensing probe 12 and temperature selection switches 14 and 16 cooperate with these elements as shown.

Probe 12 contains a thermistor, an electrical element whose conductance is a function of temperature; the conductance of probe 12 is compensated, by resistors 11 and 13, to be linear over the temperature range of interest. Probe 12 is placed in contact with the produce whose temperature is to be sensed or in contact with the air surrounding the produce.

Probe 12 forms one leg of conductance bridge 18 and, together with conductance network 24 and switches 14 and 16, which form another leg of bridge 18, supplies input 26 to bridge amplifier 20. Input 28 to amplifier 20 is a reference input supplied by the two remaining legs of bridge 18, formed by fixed conductances 30 and 32.

The conductance of the leg formed by conductance network 24 and switches 14 and 16 is selectable to be proportional to that of the thermistor of probe 12 when the sensed temperature equals that selected through switches 14 and 16.

Figure 3:
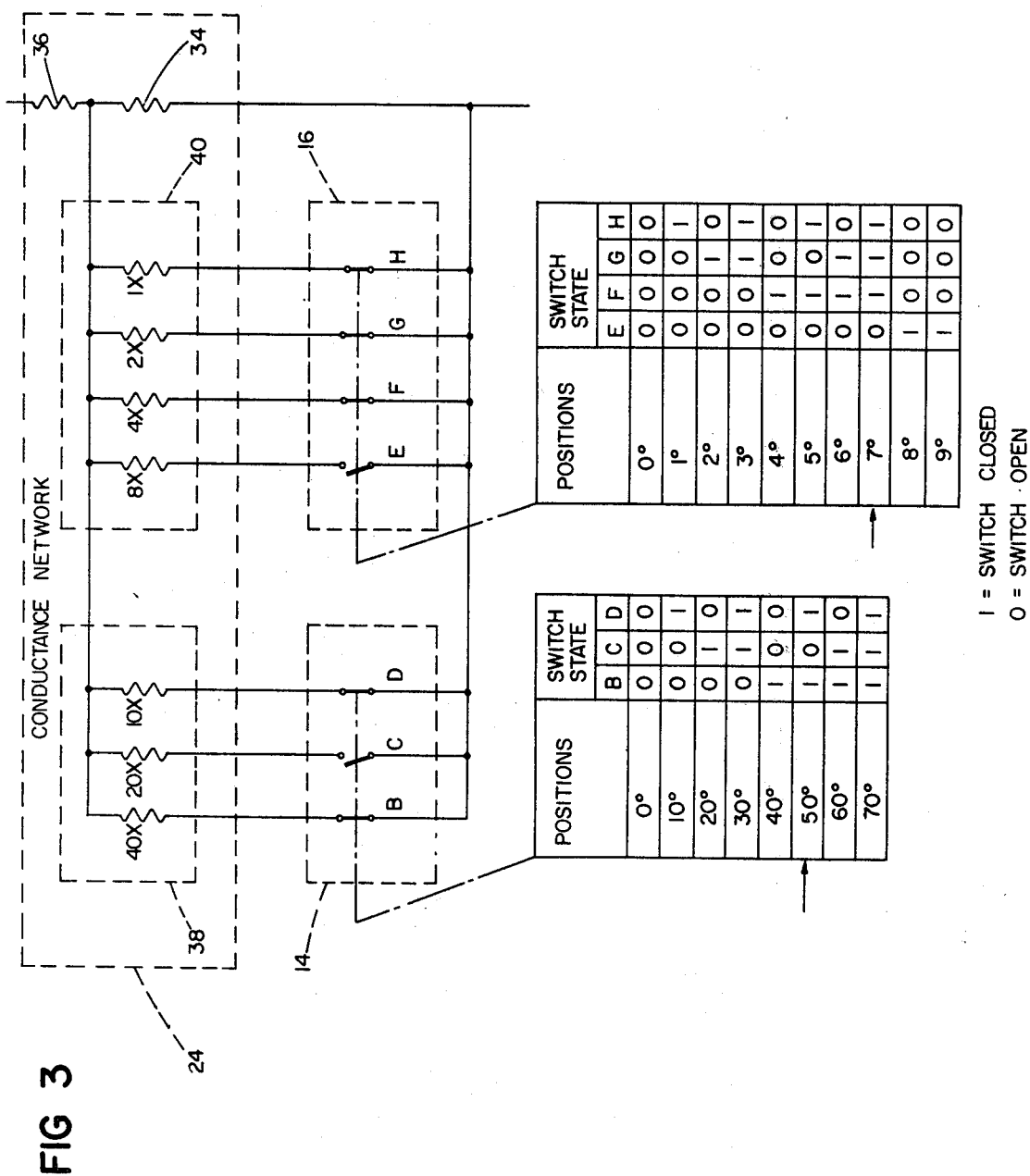
FIG. 3 shows the operation of the temperature selection switches.

Referring to FIG. 3, conductance network 24 is comprised of two conductances, 34 and 36, and two groups, 38 and 40, of conductances. Each conductance in groups 38 and 40 has a switch element from switches 14 and 16 in series with it. The switch elements of switches 14 and 16 are mechanically coupled so as to be opened and closed in a predetermined pattern as control selectors for switches 14 and 16 are moved among the possible positions which each selector may take. If the operator wishes the produce to be held at a temperature of, e.g., 57 degrees, the operator would place the selector for switch 14 in position "50" and the selector for switch 16 in position "7". The switch elements would then assume the open and closed pattern shown for them in FIG. 3 and the total conductance of groups 38 and 40 would be: $40x + 10x + 4x + 2x + 1x = 57x$. The conductance values of conductances 34 and 36 and of x are selected so that at 57 degrees, or at any other selected temperature, the conductance of network 24 is proportionate to that of probe 12 at that selected temperature. The use of network 24 and switches 14 and 16 allows the operator to select the temperatures desired for the produce, to within 1 degree, by directly setting into bridge 18 the number of degrees desired.

Returning to FIG. 2, bridge amplifier 20 compares reference input 28 to input 26 and, when the conductance of probe 12 is not proportional to that of conductance network 24, generates output 42 which is proportionate to the difference and therefore proportionate to the temperature error. Output 42 is fed back, through feedback loop 44, to the junction of probe 12 and conductance network 24 at input 26 to maintain the voltage level at this point constant. This feedback allows the determination of the sensed temperature to avoid variations in the voltages across probe 12 and network 24 arising from differences in conductances of these two legs when there is a temperature error.

Output 42 goes to quantizer 22 and, as shown in FIG. 1, to temperature error sensing circuitry 46 which will be discussed later.

Quantizer 22 quantizes output 42, which is proportionate to temperature error, into too high/too low error output 48. Quantizer 22 is a Schmitt trigger circuit having the property that once output 42 passes a given level, determined by reference input 43 from bridge 18, output 48 changes from one level to another and remains at the new level until output 42 returns to and past the level which caused output 48 to change. The difference in input levels required to cause output 48 to change is referred to as hysteresis and is used here to reduce the possibility of temperature hunting by requiring the temperature to go past the set temperature by a small amount before allowing the heating or cooling equipments to be turned off.

As shown in FIG. 1, output 48 from temperature sensing circuitry 10 goes to electrical isolation interface 50. Electrical isolation interface 50 isolates temperature sensing circuitry 10, which draws its power from power supply 52, from control circuitry 54 and heating 56, cooling 58 and fan 60 equipments which draw their power from line voltage 62.

Figure 4:
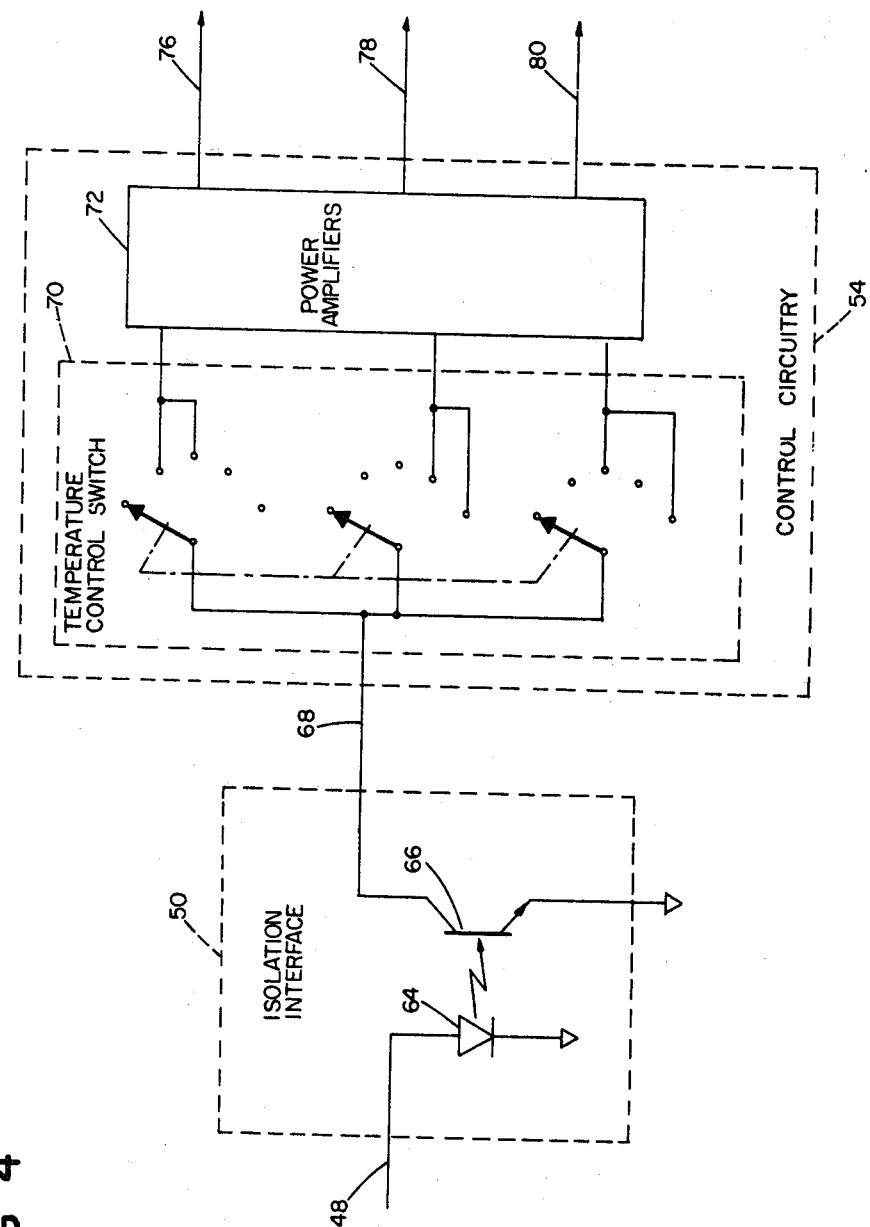
FIG. 4 shows the operation of the electrical isolation interface, the control circuitry and the heating, cooling and fan equipments.

Referring to FIG. 4, isolation interface 50 is shown as an optical device comprised of light emitting diode 64 and photo-sensitive transistor 66. Too high/too low error signal 48 causes diode 64 to emit light which in turn is detected by transistor 66 to generate output 68. Output 68 then goes to temperature control switch 70 which, with power amplifiers 72, comprise control circuitry 54. Switch 70 is a multiple position switch and the position of this switch, as selected by the operator, determines which of heating 76, cooling 78 and fan 80 control signals become active to energize their respective equipments. This approach allows temperature sensing circuitry 10 to be electrically isolated from heating 56, cooling 58 and fan 60 equipments, which operate at a different voltage potential, with control achieved through a single interface.

Returning to FIG. 1, output 42 of temperature sensing circuitry 10 is, as previously discussed in regard to FIG. 2, supplied to temperature error sensing circuitry 46. Output 42 comes from bridge amplifier 20.

Figure 5:
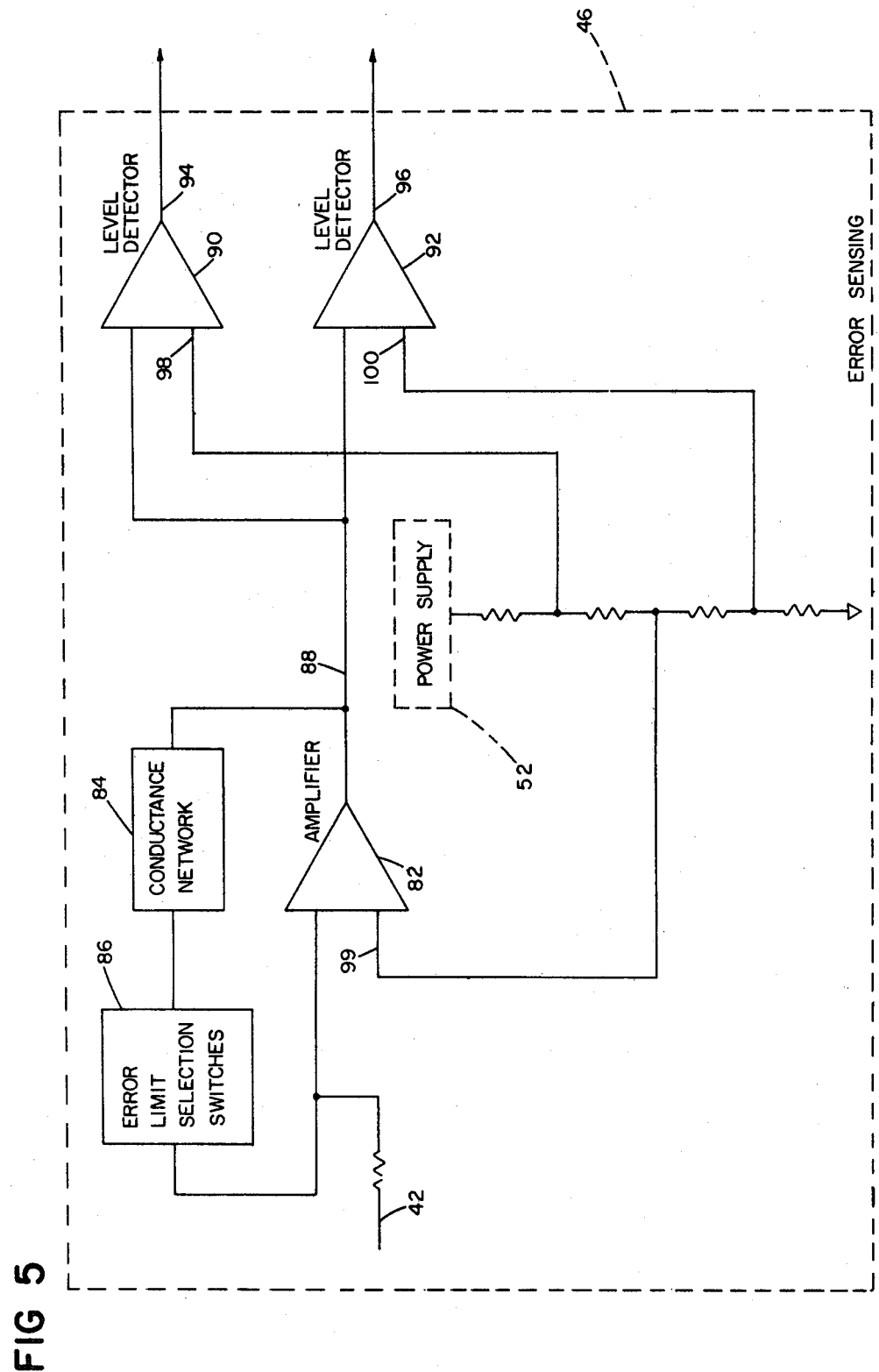
FIG. 5 shows the operation of the temperature error sensing circuitry.

Referring to FIG. 5, temperature error sensing circuitry 46 uses output 42 to detect whenever the actual sensed temperature of the produce goes outside of selected limits centered about the desired temperature. Output 42 goes to amplifier 82 which has a selectable gain circuit comprised of conductance network 84 and error limit selection switch 86. Output 88 from amplifier 82 goes to level detectors 90 and 92. Output 42 is at the midpoint of its range when there is no temperature error and deviates from this midpoint when there is an error by an amount proportionate to the error. Likewise, output 88 is at the midpoint of its range when output 42 indicates no error and deviates from its midpoint by an amount proportionate to the deviation of output 42 from its midpoint. The deviations from midpoint of outputs 42 and 88 represent the difference between the sensed and desired temperatures so that the midpoints of these outputs always represent the desired temperature, regardless of what desired temperature is actually selected, and the deviations represent error with respect to that desired temperature. Level detector 90 compares output 88 to upper detection level 98 and output 94 indicates when output 88 goes above detection level 98 while level detector 92 compares output 88 to lower detection level 100 and output 96 indicates when output 88 goes below lower detection level 100. Detection levels 98 and 100 are, respectively, located equal amounts above and below the midpoint of output 88, which is determined by reference input 99 to amplifier 82, and are therefore centered about the desired temperature. The selectable gain network of amplifier 82 determines the amount by which output 88 deviates from its midpoint for a given deviation from midpoint of output 42. The gain of amplifier 82 can be selected so that, for a given temperature error, output 88 will equal detection levels 98 or 100. This causes detection levels 98 and 100 to appear as if they were selectable error limits centered about the desired temperature. For example, if the midpoint of output 42 were 3 volts, that of output 88 were 3 volts, the upper and lower detection levels were, respectively, 3.1 and 2.9 volts and output 42 deviated from 3 volts by 0.1 volt per degree of temperature error, choosing the gain of amplifier 82 to be 1 would cause output 88 to equal 2.9 or 3.1 volts for a 0.1 volt deviation in output 42. This would cause the upper and lower error limits to appear to be 1.0 degree above and below the desired temperature. Likewise, choosing the gain of amplifier 82 to be 0.2 would cause the error limits to appear to be 5.0 degrees above and below the desired temperature. By using two fixed detection levels, centered about the desired temperature, and selecting the amount of deviation in output 88 for a given error, both error limits may be established simultaneously through a single control and a temperature error is detected regardless of the direction of the error with respect to the desired temperature.

Conductance network 84 and error limit selection switch 86 are similar to conductance group 38 and switch 14 shown in FIG. 3. Network 84 is comprised of four conductances in parallel with each conductance having a switch element of switch 86 in series with it. The switch elements of switch 86 are mechanically coupled to a selector and open and close in a predetermined pattern as this selector is moved among the possible position it may take. The conductances of network 84 and the opening and closing pattern of the switch elements are chosen so that the selector establishes the positions of the upper and lower error limits relative to the desired temperature in terms of decimal units of degrees of temperature.

As shown in FIG. 1, outputs 94 and 96 of error sensing circuitry 46 go to alarm circuitry 102.

Figure 6:
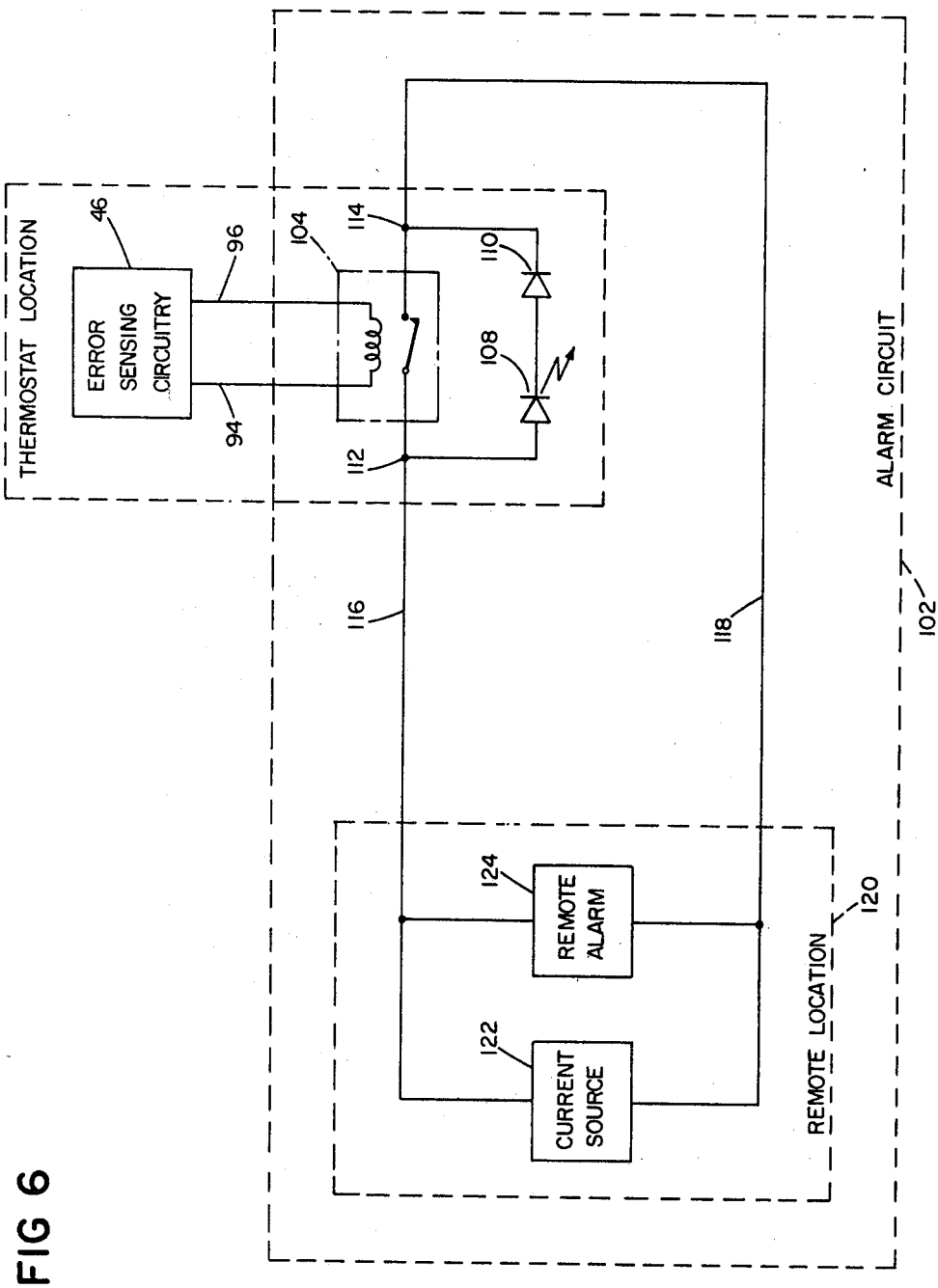
FIG. 6 shows the operation of the alarm circuitry.

Referring to FIG. 6, outputs 94 and 96 go to relay 104 at thermostat location 106 and control the operation of relay 104. When there is no temperature error, outputs 94 and 96 hold relay 104 in the closed, or conducting, position. If there is a temperature error, outputs 94 and 96 will cause relay 104 to open. Likewise, a failure of power to the thermostat will cause relay 104 to open since power is required for outputs 94 and 96 to hold relay 104 in the closed position. Diodes 108 and 110 are connected in series between terminals 112 and 114 of relay 104 and the circuit comprised of diodes 108 and 110 and terminals 112 and 114 of relay 104 is connected in series with wires 116 and 118. Wires 116 and 118 extend from remote location 120 where current source 122 and remote alarm circuit 124 are connected between wires 116 and 118. Current source 122 generates an alternating current which flows in the loop comprised of wires 116 and 118 and terminals 112 and 114 in opposite directions on alternate half cycles. When relay 104 is closed, relay 104 presents a short circuit between terminals 112 and 114 and around diodes 108 and 110 and current from source 122 can flow freely in both directions around the loop. When relay 104 is open, the current in the loop is forced to flow through diodes 108 and 110. Diode 108 is a light emitting diode which emits light when current flows through it in one direction and which blocks the flow of current in the other direction; diode 110 is placed in the circuit to protect diode 108 from excessive voltage when diodes 108 and 110 are blocking the flow of current. When source 122 generates a current flowing in one direction on one half cycle, diodes 108 and 110 will conduct and allow the current to flow around the loop and diode 108 will emit light, indicating the presence of a fault. When source 122 generates a current to flow in the other direction on the other half cycle, diodes 108 and 110 will block the flow of current and a voltage will appear between wires 116 and 118. This voltage between wires 116 and 118 will be detected by remote alarm circuit 124, which will then generate an alarm indication at remote location 120. Remote alarm circuit 124 provides a time delay between the appearance of the voltage between wires 116 and 118 and the generation of the alarm indication to reduce the possibility of false alarms. Alarm circuit 102 allows a number of thermostats at different locations to be connected in series with wires 116 and 118, in the same manner as at thermostat location 106, so that there will be an individual alarm indication at each thermostat location and a general alarm indication at the remote location. The alarm at the remote location will indicate if there is a failure or error at any of the thermostat locations and the alarms at the thermostats will indicate which thermostats are experiencing an error or failure.

Figure 7:
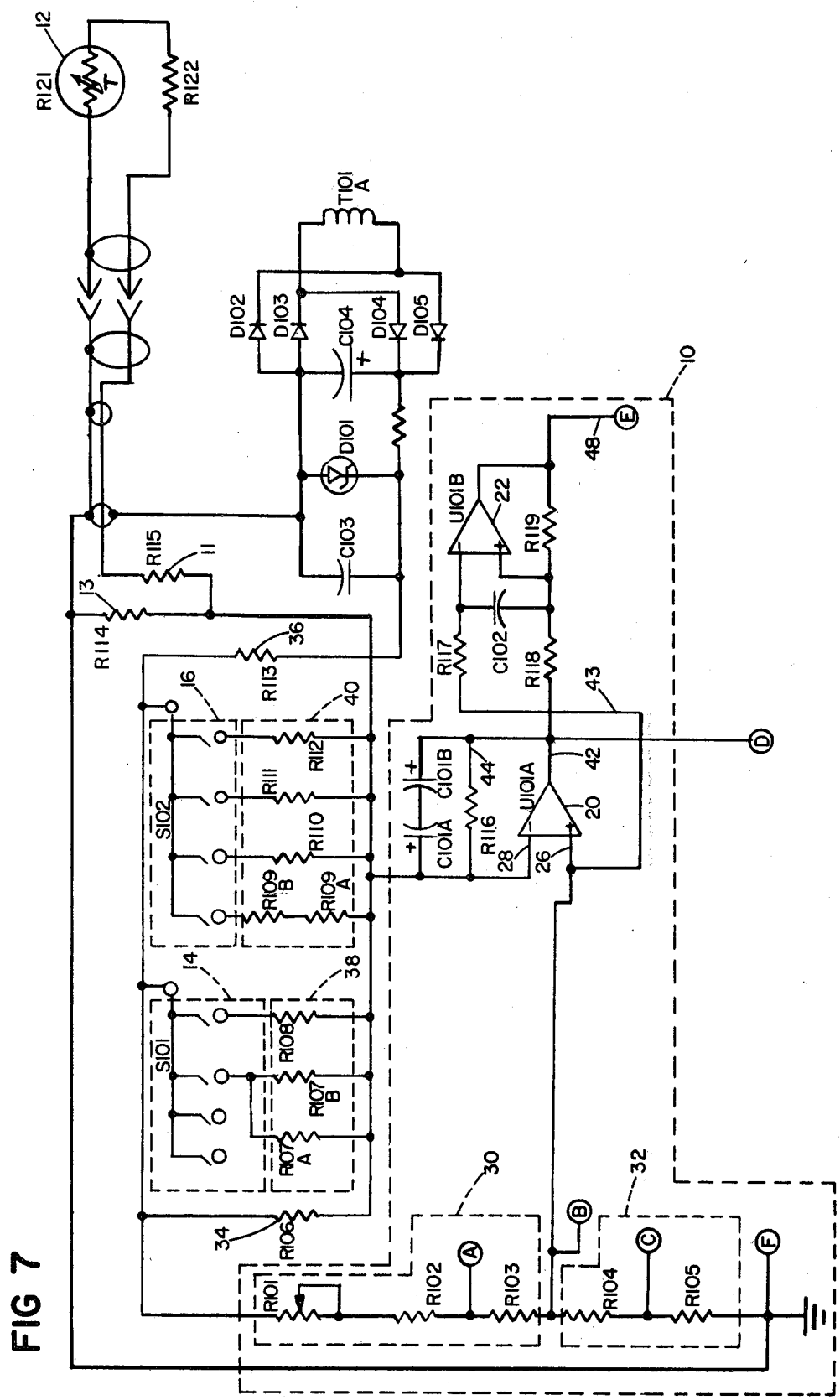
FIGS. 7-9 are detailed schematics of the circuitry shown in block diagram form in FIGS. 1-6; conventional electrical symbols are used. Points electrically in common are indicated by letters enclosed in circles, and the reference designation numbers used in FIGS. 1-6 and the description are repeated in FIGS. 7-9.
Figure 8:
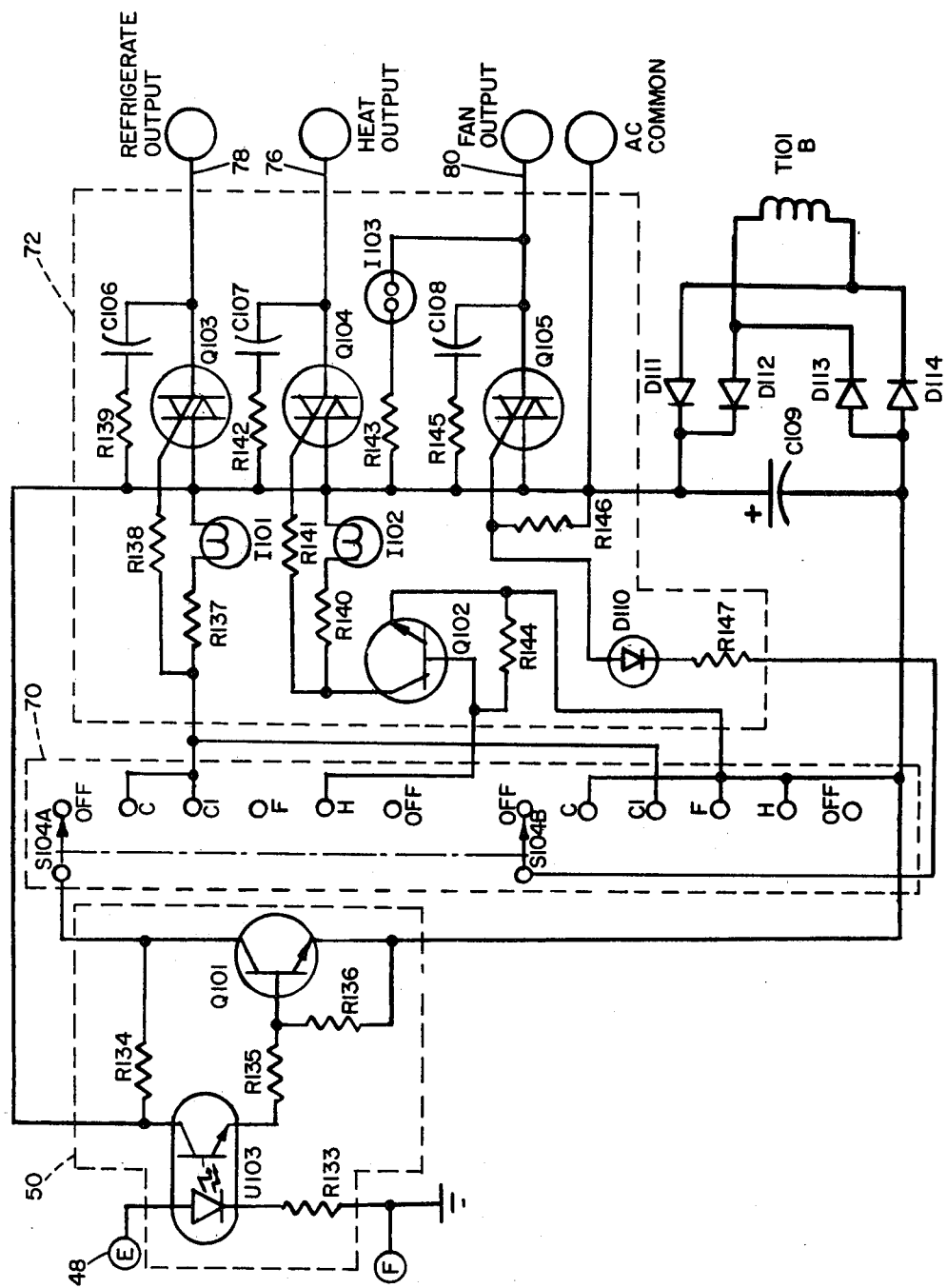
Figure 9:
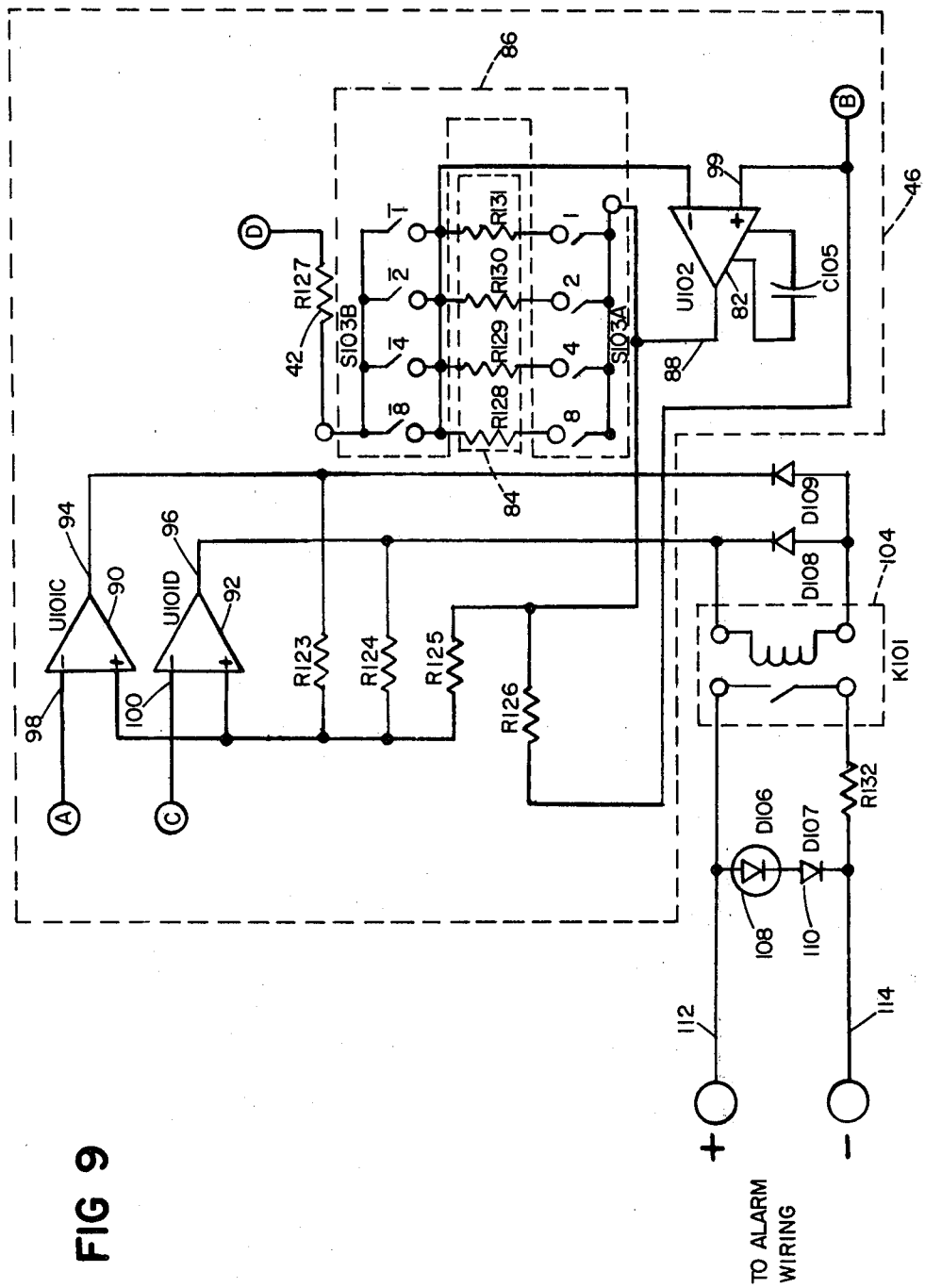

Referring to FIGS. 7–9, the following table contains the circuit components used in the circuitry of FIGS. 7–9.

COMPONENT TABLE

| Resistors | | |
|---|---|---|
| R101 | 200Ω | cermet potentiometer |
| R102 | 1.5K | 1%, metal film, ⅛ watt |
| R103 | 100Ω | 1%, metal film, ⅛ watt |
| R104 | 100Ω | 1%, metal film, ⅛ watt |
| R105 | 1.5K | 1%, metal film, ⅛ watt |
| R106[a] | 8.06K | 1%, metal film, ⅛ watt |
| R107[a] | 51.1K | 1%, metal film, ⅛ watt |
| R107A[a] | 51.1K | 1%, metal film, ⅛ watt |
| R108[a] | 51.1K | 1%, metal film, ⅛ watt |
| R109A[a] | 51.1K | 1%, metal film, ⅛ watt |
| R109B[a] | 12.7K | 1%, metal film, ⅛ watt |
| R110 | 127K | 1%, metal film, ⅛ watt |
| R111 | 255K | 1%, metal film, ⅛ watt |
| R112 | 510K | 5%, carbon film, ¼ watt |
| R113 | 620 | 5%, carbon film, ¼ watt |
| R114 | 56.2K | 1%, metal film, ⅛ watt |
| R115 | 3.01K | 1%, metal film, ⅛ watt |
| R116 | 15.8K | 1%, metal film, ⅛ watt |
| R117 | 20K | 5%, carbon film, ¼ watt |
| R118 | 20K | 5%, carbon film, ¼ watt |
| R119 | 1.3M | 5%, carbon film, ¼ watt |
| R120 | 130 | 5%, carbon film, ⅛ watt |
| R121 | thermistor, YSI #44004:2,253Ω at 25° C. | |
| R122 | 100Ω | 1%, metal film, ⅛ watt |
| R123 | 510K | 5%, carbon film, ¼ watt |
| R124 | 510K | 5%, carbon film, ¼ watt |
| R125 | 1.5K | 5%, carbon film, ¼ watt |
| R126 | 1.3M | 5%, carbon film, ¼ watt |
| R127 | 5.9K | 1%, metal film, ⅛ watt |
| R128 | 1.5K | 1%, metal film, ⅛ watt |
| R129 | 3.01K | 1%, metal film, ⅛ watt |
| R130 | 5.9K | 1%, metal film, ⅛ watt |
| R131 | 12K | 5%, carbon film, ¼ watt |
| R132 | 22Ω | 5%, carbon film, ¼ watt |
| R133 | 620Ω | 5%, carbon film, ¼ watt |
| R134 | 3K | 5%, carbon film, ¼ watt |
| R135 | 3K | 5%, carbon film, ¼ watt |
| R136 | 3K | 5%, carbon film, ¼ watt |
| R137 | 10Ω | 5%, carbon film, ¼ watt |
| R138 | 330Ω | 5%, carbon film, ⅛ watt |
| R139 | 100Ω | metal oxide, flameproof, ½ watt |
| R140 | 10Ω | 5%, carbon film, ¼ watt |
| R141 | 330Ω | 5%, carbon film, ⅛ watt |
| R142 | 100Ω | metal oxide, flameproof, ½ watt |
| R143 | 150K | 5%, carbon film, ¼ watt |
| R144 | 3K | 5%, carbon film, ¼ watt |
| R145 | 100Ω | metal oxide, flameproof, ½ watt |
| R146 | 620Ω | 5%, carbon film, ¼ watt |
| R147 | 270Ω | 5%, carbon film, ⅛ watt |

| Capacitors | |
|---|---|
| C101A | 47mf, 10v, aluminum electrolytic |
| C101B | 47mf, 10v, aluminum electrolytic |
| C102 | 0.1mf, 16v, ceramic |
| C103 | 0.1mf, 16v, ceramic |
| C104 | 470mf, 25v, aluminum electrolytic |
| C105 | .0033mf, 50v, ceramic |
| C106 | .02mf, 600v, ceramic |
| C107 | .02mf, 600v, ceramic |
| C108 | .02mf, 600v, ceramic |
| C109 | 470mf, 25v, aluminum electrolytic |

-continued
COMPONENT TABLE

| D101 | IN5236B, 7.5v zener, ½ watt |
|---|---|
| D102–105 | IN4001, 50v, 1A, rectifier |
| D106 | Fairchild MV-5054-1, red led |
| D107–109 | IN4148 |
| D110 | Hewlett-Packard #5082-4557, yellow led |
| D111–114 | In4001, 50v, 1A, rectifier |
| Q101–102 | 2N4401 |
| Q103–105 | General Electric #SCi36D,3A, 400v(260vRMS), Triac |
| V101-A,B,C,D[c] | LM 324N Quad Opertional Amplifier |
| V102[c] | LM 301A Quad Operational Amplifier |
| V103 | Fairchild Semiconductor #FCD820 Optical Isolator |
| S101,102 BCD, 0–9, S103-A,B | Thumbwheel Switches Binary Coded, 16 position (0–15) Double Pole Thumbwheel Switch (A true; B complement) |
| S104-A,B | Two Pole, Thumbwheel Switch (special order with logic as shown) |
| T101 | Power Transformer, 110/220 VAC to Dva/(A&B) 10 VAC, 220 ma Seconlaries; Signal Transformer Co. #DPC-20-220 |
| I101,102 | 14v, 80ma, T¾ lamp |
| I103 | Green glow lamp |
| K101 | Reed Relay, SPST No 5v 700 coil (35mw) |

[a] matched to ± ⅛%
[b] selected values, 70–130Ω, for 2 probe 12 interchangeability.
[c] power connections (+7.5 vdc, ground) not shown

I claim:
1. A device for monitoring and controlling the temperature of products within an enclosure comprising: a bridge circuit having as a first leg a temperature sensing, self-linearizing network that includes a thermistor arranged with a plurality of resistors, one in series and one in parallel with said thermistor, said network establishing a substantially linear overall conductance curve for said first leg over a temperature range of interest, and a digital set point selector network in a second leg of said bridge circuit to select digital values of the temperature over said range of interest, said set point network comprising: a set of conductances, said conductances being connected in parallel with one another, each said conductance of said set having a switch element in series with it, and a further conductance in parallel with said set of conductances, said further conductance having a value to establish a first conductance limit of the selector network when all of the conductances in said set of conductances are switched out of said network thereby to define a bridge balance point at one end of said temperature range of interest, the values of said conductances of said set being predetermined to establish, by selective switching, a series of decimal temperature bridge balance points over said linearized portion of said conductance curve of said sensing network thereby to establish a progressive series of temperature set points in decimal steps; a bridge amplifier connected to the bridge circuit to generate an error signal output when the sensed temperature of said temperature sensing self-linearizing network differs from the selected temperature of said digital set point selector network; and signaling means responsive to the amplifier error signal output for giving warning or signaling correction to temperature control means.

2. The device of claim 1 wherein said conductances of said set are arranged in a tens group and a units group, the values in each group having a binary coded decimal relationship, the switching pattern of said switch elements arranged to select degrees of temperature in decimal unit steps over the entire range of interest.

3. The device of claim 1 wherein said first and second legs of said bridge circuit, containing respectively said self-linearizing sensing network and said digital set point selector network are connected in series to provide a temperature offset signal at the junction between said first and second legs, said temperature offset signal connected to said amplifier for comparison to a reference signal to produce said error signal.

4. The device of any preceding claim wherein said signaling means includes an error signal amplifier, upper and lower limit detectors connected to the output of said error signal amplifier, and means for adjusting the gain of said error signal amplifier to simultaneously change the effective threshold values of said upper and lower limit detectors.

5. A temperature monitoring and control circuit for monitoring the temperature of products within an enclosure which can have various critical temperature characteristics, comprising a reference network that provides upper and lower signal outputs and a bridge reference signal output, the value of said bridge reference signal being intermediate the values of said upper and lower signal outputs, said reference network forming a bridge reference branch, a bridge circuit formed by a temperature sensing branch and said reference branch, said temperature sensing branch providing a temperature signal output, said bridge circuit including means to vary a desired set point temperature at which said outputs are equal, a bridge amplifier having as inputs said temperature signal and reference signal outputs and constructed to generate an error signal output dependent upon the difference between said inputs, a temperature control means responsive to said error signal, effective to change the thermal condition in said enclosure in a sense to reduce said error signal, an error sensing alarm-activating circuit which includes upper and lower detectors, each detector having a function of said error signal as one input and said upper and lower signal outputs from said reference network as respective second inputs, each detector having an output serving as an alarm-activating signal, respectively for upper and lower danger conditions, and control means connected to selectively adjust said error sensing alarm-activating circuit to vary simultaneously the effective thresholds of both of said detectors thereby to enable variations of the size of the error signal required to establish an alarm-activating condition in a manner that is independent of the set point temperature and of said temperature control means.

6. The device of either claim 1 or 5 further including a feedback connection between said bridge amplifier output and the temperature signal of said bridge, said feedback connection maintaining said bridge circuit in electrical balance despite conductance differences between temperature sensing and set point selector portions of said bridge.

7. The device of either claim 1 or 5 wherein said temperature control means comprises means for quantizing said error signal output into a single quantized signal indicating said actual temperature is too high or too low, control circuitry for controlling temperature control equipments comprising a power amplifier for each said equipment, each said power amplifier having an input and an output, said power amplifier output energizing said corresponding equipment when said power amplifier input is activated by said quantized signal, and a multiple position switch, said switch having said quantized signal as its input and an output to each said power amplifier, said switch determining which of said power amplifiers will be activated by said error signal, and a single electrically isolating link communicating said quantized signal from said quantizing means to said control circuitry switch and connected between said quantizing means and said control circuitry to electrically isolate said sensing and quantizing means from said control circuitry and equipments.

8. The device of claim 5 wherein said temperature sensing branch has, in a first leg, a thermistor sensor and a plurality of resistors arranged to provide a substantially linear conductance curve over a selected temperature range of about 40° F., and said temperature sensing branch has in a second leg a digital set point selector network comprising a set of switchable conductances in parallel with one another, the values of said switchable conductances corresponding to a series of decimal temperature steps on said linear portion of said conductance curve of said sensing network whereby by progressive selection of said switchable conductances into the selector network, respective bridge balance points are established corresponding to respective decimal temperature values within said temperature range.

* * * * *